US009262483B2

(12) United States Patent
Drucker et al.

(10) Patent No.: US 9,262,483 B2
(45) Date of Patent: *Feb. 16, 2016

(54) COMMUNITY AUTHORING CONTENT GENERATION AND NAVIGATION

(71) Applicant: Microsoft Corporation, Redmond, WA (US)

(72) Inventors: Steven M. Drucker, Bellevue, WA (US); Ray A. Bittner, Jr., Sammamish, WA (US); Curtis G. Wong, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,876

(22) Filed: Oct. 15, 2013

(65) Prior Publication Data

US 2014/0046960 A1 Feb. 13, 2014

Related U.S. Application Data

(63) Continuation of application No. 12/816,689, filed on Jun. 16, 2010, now Pat. No. 8,595,220.

(51) Int. Cl.
*G06F 17/30* (2006.01)
*G06Q 30/02* (2012.01)

(52) U.S. Cl.
CPC ...... *G06F 17/3053* (2013.01); *G06F 17/30011* (2013.01); *G06F 17/30719* (2013.01); *G06Q 30/02* (2013.01)

(58) Field of Classification Search
None
See application file for complete search history.

(56) References Cited

U.S. PATENT DOCUMENTS

| 4,054,553 | A |   | 10/1977 | Olander |
|-----------|---|---|---------|---------|
| 4,092,294 | A |   | 5/1978  | Bennett, Jr. et al. |
| 4,477,659 | A |   | 10/1984 | Nishikido et al. |
| 5,011,889 | A |   | 4/1991  | Hamersma et al. |
| 6,138,159 | A | * | 10/2000 | Phaal ............ 709/226 |
| 7,519,562 | B1 |  | 4/2009  | Vander Mey et al. |
| 7,565,372 | B2 |  | 7/2009  | Zhang et al. |
| 7,778,890 | B1 |  | 8/2010  | Bezos et al. |

(Continued)

OTHER PUBLICATIONS

Manual of Patent Examination Preparation Jul. 8, USPTO, Edition 8 Revision 8, 500-1 600-1 600-66 600-77 through 80 700-1 700-5 700-111 through 113 700-130 700-236 through 700-238.*

(Continued)

*Primary Examiner* — Jason Liao
(74) *Attorney, Agent, or Firm* — Alin Corie; Sandy Swain; Micky Minhas

(57) ABSTRACT

One or more techniques and/or systems are provided for creating socially authored, or community authored, summaries of documents and/or for navigating a forum comprising such summaries. In one embodiment, at least some of the summaries are generated automatically when a document is written and/or discovered (e.g., by a web crawler), for example. In another embodiment, the documents are created by users of the forum. A plurality of summaries of a document may be created (e.g., by different users), and users can provide feedback, such as comments or ratings, that may assist other users in identifying which summary or summaries better describe the document. Moreover, the users can navigate the forum and retrieve summaries by browsing categories (and subcategories) to identify a topic of interest and/or by performing a search based upon user inputted search term(s).

20 Claims, 6 Drawing Sheets

(56) References Cited

U.S. PATENT DOCUMENTS

| | | | |
|---|---|---|---|
| 7,925,496 B1* | 4/2011 | Rubin | 704/7 |
| 8,442,984 B1* | 5/2013 | Pennock et al. | 707/748 |
| 8,595,220 B2 | 11/2013 | Drucker et al. | |
| 2002/0078090 A1 | 6/2002 | Hwang et al. | |
| 2002/0138529 A1 | 9/2002 | Yang-Stephens et al. | |
| 2004/0225651 A1 | 11/2004 | Musgrove et al. | |
| 2008/0133482 A1 | 6/2008 | Anick et al. | |
| 2008/0313166 A1 | 12/2008 | Yu et al. | |
| 2009/0138472 A1 | 5/2009 | MacLean | |
| 2010/0042660 A1 | 2/2010 | Rinearson et al. | |
| 2011/0302162 A1* | 12/2011 | Xiao et al. | 707/724 |

OTHER PUBLICATIONS

Dell Latitude D400 2004, Dell Inc., http://www.dell.com/downloads/us/products/latit/d400_spec.pdf.*

Google Scholar beta, captured on Nov. 19, 2009 by archive.org, Google, https://web.archive.org/web/20091119052122/http://scholar.google.com/.*

Notice of Allowance mailed May 31, 2013 from U.S. Appl. No. 12/816,689, 10 pages.

Amazon.com, <<http://web.archive.org/web/20080614014310/http://www.amazon.com/Plan-Community-Survival-Stategies-Climate/dp/0865716072>>, captured on Jun. 14, 2008, retrieved on Feb. 4, 2013, 6 pages.

"Site Everything 2", retrieved Feb. 24, 2010 at <<http://everything2.com/>>, 2 pages.

Amazon.com, <<http://web.archive.org/web/19991013091817/http://amazon.com/>>, captured Oct. 13, 1999, retrieved on Aug. 6, 2012, 2 pages.

Chu, Annie, "IRS Cracks down on eBay, Amazon Marketplace and Other Online Sellers' profits starting in 2011", Mar. 26, 2010, examiner.com, retrieved Feb. 4, 2013 at <<http://examiner.com/article/irs-cracks-down-on-ebay-amazon-marketplace-and-other-online-sellers-profits-starting-2011>>, 5 pages.

Kan et al., "Applying Natural Language Generation to Indictive Summarization", Annual Meeting of the ACL, Proceedings of the 8th European Workshop on Natural Language Generation, colume 8, Jul. 6-7, 2001, 9 pages.

Kittur et al., "Crowdsourcing User Studies With Mechanical Turk", Conference on Human Factors in Computing Systems, Proceeding of the 26th Annual SIGCHI Conference on Human Factors in Computing Systems, Apr. 5-10, 2008, 4 pages.

Lee et al., "Integrating Web Information to Generate Chines Video Summaries", Proceedings of the 17th International Conference on Software Engineering and Knowledge Engineering (SEKE), Jul. 14-16, 2005, 6 pages.

Maybury et al., "Multimedia Summaries of Broadcast News", IASTED International Conference on Intelligent Information Systems (IIS '97), Dec. 8-10, 1997, pp. 442-449, 8 pages.

Radev et al., "Generating Natural Language Summaries from Multiple On-Line Sources", Computational Linguistics, Special issue on Natural Language Generation, vol. 24, No. 3, Sep. 1998, pp. 469-500, 32 pages.

Amazon.com, retrieved Feb. 4, 2013 at <<http://www.amazon.com/Plan-Community-Survival-Strategies-Climate/dp/0865716072/ref=cm_cr_pr_product_top>>, captured Aug. 5, 2008, retrieved Feb. 4, 2013, 8 pages.

Non-Final Office Action mailed Mar. 21, 2012 from U.S. Appl. No. 12/816,689, 22 pages.

Response filed Jul. 23, 2012 to Non-Final Office Action mailed Mar. 21, 2012 from U.S. Appl. No. 12/816,689, 13 pages.

Final Office Action mailed Aug. 10, 2012 from U.S. Appl. No. 12/816,689, 18 pages.

Response filed Nov. 12, 2012 to Non-Final Office Action mailed Aug. 10, 2012 from U.S. Appl. No. 12/816,689, 13 pages.

Non-Final Office Action mailed Feb. 8, 2013 from U.S. Appl. No. 12/816,689, 22 pages.

Response filed May 8, 2013 to Non-Final Office Action mailed Feb. 8, 2013 from U.S. Appl. No. 12/816,689, 15 pages.

* cited by examiner

COMMUNITY AUTHORING CONTENT GENERATION AND NAVIGATION

RELATED APPLICATION

This application is a continuation of U.S. application Ser. No. 12/816,689, filed on Jun. 16, 2010, entitled "COMMUNITY AUTHORING CONTENT GENERATION AND NAVIGATION", at least some of which may be incorporated herein.

BACKGROUND

Information is being produced in the world at a prodigious rate. For example, in the medical informatics field, the number of publications each year has more than doubled in the last decade. While such growth brings with it enormous possibilities, it is becoming increasingly difficult to stay current with advancements in a particular field. To decipher all of this information, numerous tools have been developed that help an interested party both understand the field and provide input into the field. For example, websites have been created that provide user generated, or society generated, encyclopedias. Such tools provide a starting point (and sometimes an ending point) for researching a particular area of interest. While these tools have proven very useful for synthesizing information, their features, and thus their utility, have been limited. For example, such tools typically do not inform readers where to go to find recently published articles on a topic and/or allow users to create multiple articles on the same topic.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for generating summaries of documents and displaying the generated summaries are provided herein. Such summaries may be socially authored by users of a forum (e.g., website) and may (or may not) be modifiable by users other than the original author of the summary. Moreover at least a portion of the summaries comprised in a summary data store (which stores summaries configured to be displayed in the forum) may be automatically generated using analytic, iterative, or other content generating techniques known to those skilled in the art. In this way, a socially authored forum which comprises a plurality of document summaries can be created and navigated.

As will be understood to those skilled in the art, a summary is generally a brief description, or synopsis, of a document and is intended to provide a user with insight into the document (e.g., so that a user can make a decision whether or not to read more of the document). The summary may be a summary of a technical document, dissertation, journal article, book, etc. As described herein, the text of the summary may also comprise links to other summaries, documents, webpages, etc. For example, the summary may comprise a link to a second summary (e.g., of another document) which provides background information that is relevant to the topic being described in the document to which the summary relates. Such links may be inserted by the author or may be automatically inserted into the summary after the summary has been generated (e.g., by the author or by an automated summary generation technique).

Summaries, or links (e.g., hyperlinks) to summaries, are displayed to a user of the forum when the user performs a search and/or selects a topic from a plurality of topics. In one embodiment, as summaries are read by users of the forum, the users may be provided an option to rank and/or comment on the summary. In this way, a user that generated a summary may be provided feedback (e.g., which may provide suggestions to the author for improving the summary). Moreover, in one embodiment, an aggregated rank (e.g., based upon rankings provided from a plurality of users) and/or comments about the respective summaries can be used to order a plurality of summaries of a document when the summaries, or links to the summaries, are displayed to a user. Further, the aggregated rank and/or comments may provide insight to users that are attempting to select which summary of a document to read for the first time, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
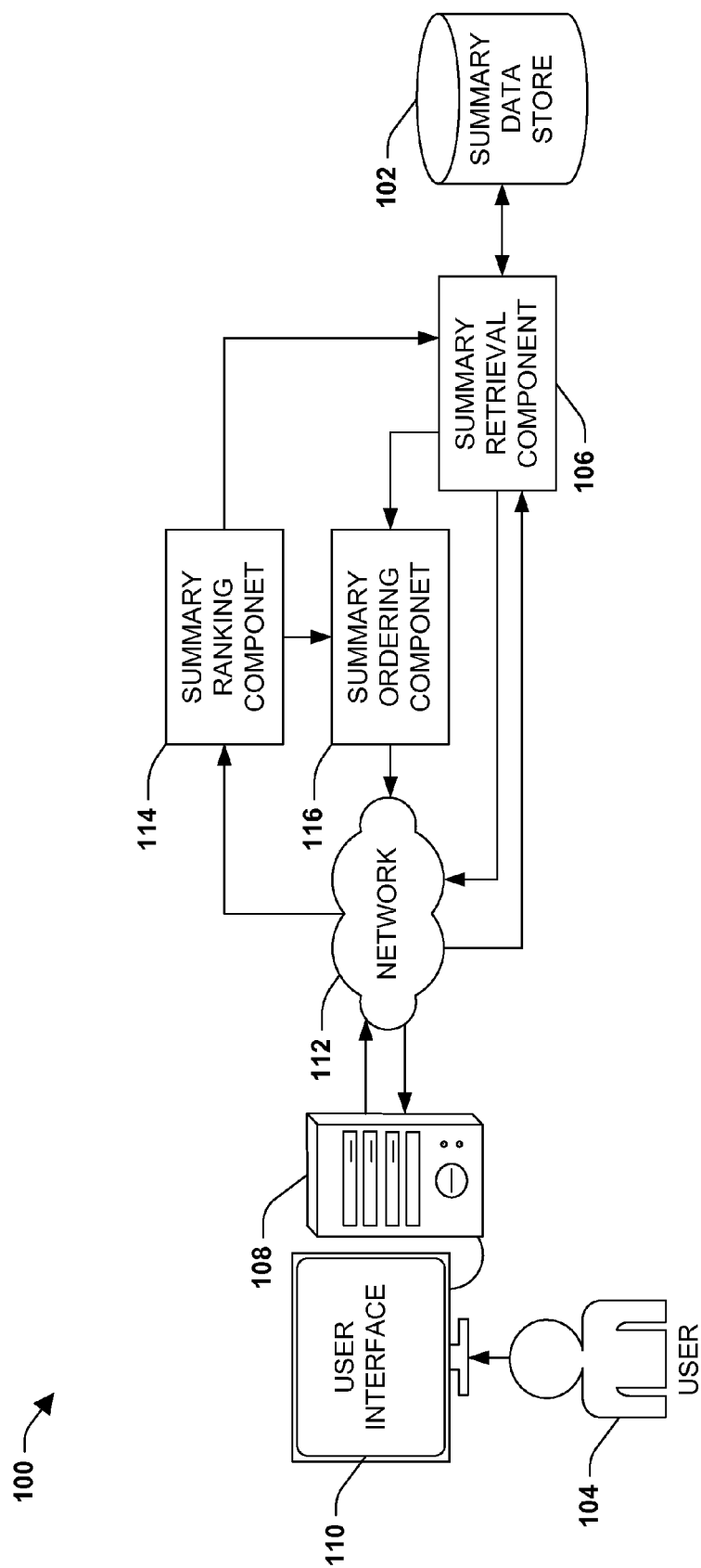
FIG. 1 is a component block diagram illustrating an exemplary system for sharing one or more summaries indicative of a document.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Society's recognition and appreciation for socially authored content, or community authored content, has increased exponentially in the past few years. The speed of innovation makes it difficult for a limited number of well-trained, specialized writers (e.g., traditional encyclopedia writers) to thoroughly describe innovations in a timely manner. Moreover these specialized writers have to pick and chose which innovations are most significant to discuss because the speed of innovation outpaces the capabilities of the writers.

Today, one of the most popular websites in the U.S. is a website pertaining to socially authored content. More particularly, it comprises encyclopedia-like entries that are created and modified by users of the website. On any given day, users can go to this and other similar websites to find out information on a wide spectrum of topics, including the background of a particular restaurant or person, the development of a technology, etc. Socially-authored tools, such as websites that provide users with a forum to write articles pertaining to a topic of interest, provide enormous benefits to society. The large pool of writers (e.g., anyone who visits the website) allows for more topics to be discussed (e.g., better keeping pace with innovation and discovery). Moreover, because not all of the writers are specialized in the given field, the writings are typically understandable by a larger audience than technical papers written specifically for those skilled in the art, for example.

While current tools have proven effective for the aforementioned reasons, their features (or lack of features) have limited their adoption in some fields and/or limited their scope and/or utility. For example, such tools typically provide a single entry on a given topic. Thus, users must work together to create an entry that is amicable to a plurality of users interested in the topic. If a user disagrees with the structure and/or content of the entry, the user cannot create his/her own entry on the topic and let other users decide which entry is more appropriate. Moreover current tools do not typically point to recently published documents that may provide additional insight into a given topic and/or may closely parallel the topic of the entry. At best, the current tools allow for the citation of references. However, it will be appreciated that such references may not be on topic. Rather, the references may contain only a single sentence that indirectly pertains to the topic, for example.

Accordingly, one or more systems and/or techniques for creating and/or sharing one or more summaries indicative of a document are provided herein. In one embodiment, a forum (e.g., internet website, intranet website, etc.) is created that allows users of the forum to create and/or share one or more summaries pertaining to a given document (e.g., book, technical paper, medical paper, etc.). The summaries may be saved in a database and later recalled when a user selects to view summaries of the given document, for example. It will be appreciated that summaries may be recalled using numerous techniques known to those skilled in the art. For example, the user may conduct a query (e.g., search) and/or may browse through categories of topics to narrow a search to summaries related to the given document or given specialty within a much larger field. Users may also vote, or otherwise rank, which of a plurality of summaries of the given document he/she prefers. In this way, future users may be provided insight into which summary of a document to view first.

It will be appreciated that the term summary is used broadly herein to refer to an abbreviated (e.g., shorter) version of a document, and a document is likewise to be broadly interpreted to comprise a mass of content, such as a book, online article, technical document, movie, literature, concept, etc. Generally, the summary highlights, or focuses on, major points of a document and is intended to give a reader of the summary a brief understanding of the document to which the summary relates. For example, a summary may be a one paragraph or one page synopsis of a 300 page book that describes the general thesis of the book.

An exemplary system 100 for providing one or more summaries indicative of a document is illustrated in FIG. 1. The system 100 comprises a summary data store 102, such as a database, central repository, etc., configured to store one or more summaries of a document(s). As will be discussed below, such summaries can be generated programmatically (e.g., automatically) using analytic, iterative, or other content generation techniques known to those skilled in the art. Summaries can also be generated by users, such as the illustrated user 104, and stored in the summary data store 102 for later retrieval (e.g., to be displayed to other users upon request). For example, the user 104 may read a book, dissertation, etc. and create a summary of the book, dissertation, etc. That summary may then be stored in the summary data store 102. As will be described below, other users (e.g., future users of the forum) can retrieve these author generated and/or programmatically generated summaries to determine which books, dissertations, etc. are relevant to the respective users, for example.

It will be appreciated that in one embodiment, author generated and/or programmatically generated summaries may be modified by other users (e.g., to create a summary authored by numerous users) and the modified summaries may be stored in the summary data store 102. In another embodiment, an author generated and/or a programmatically generated summary of a document may not be modified, and a future user may create a second summary of the same document and store the second summary in the summary data store 102 (e.g., such that the summary data store 102 comprises numerous summaries of the same document).

The exemplary system 100 also comprises a summary retrieval component 106 configured to receive requests (e.g., from a client device 108) to retrieve one or more summaries from the summary data store 106. For example, the user 104 may open an application that comprises a user interface 110 (e.g., an internet browser configured to display a webpage). Such a user interface may comprise a search field wherein the user 104 can input one or more text strings. Using the inputted text, the client device 108 may issue a request through a network 112 (e.g., a local area network (LAN), a wide area network (WAN), etc.) for summaries related to the text string (s), for example. In another example, the user 104 may navigate a hierarchy tree, wherein requests can be made and summaries, or links to summaries, can retrieved based upon user selections. For example, navigating the user interface 110, the user 104 may begin by selecting a general topic, such as medicine, and the client device 108 may send a request for summaries pertaining to medicine through the network 112 to the summary retrieval component 106. Based upon the received request, the summary retrieval component 106 may be configured to retrieve summaries pertaining to medicine from the summary data store 102, for example. Moreover, instead of, or in combination with the summaries, the summary retrieval component 106 may be configured to retrieve the articles upon which the summaries are based from the summary data store 102 or another similar data store and/or links indicative of more specialized topics within field of medicine (e.g., cardiovascular, orthopedic, etc.). Using such links, the user 104 may navigate to a topic of interest (e.g., starting with a broad field (medicine) and narrowing the field down to a desired topic (recent MRI developments) within the broader field by repeatedly narrowing the scope of summary retrieval through multiple requests, for example).

The example system 100 also comprises a summary ranking component 114 that is configured to store information on the popularity or likability of a particular article based upon one or more user-provided metrics. For example, once a summary has been retrieved from the summary data store 102 (e.g., by the summary retrieval component 106) and displayed to the user 104 through the user interface 110, the user 104 may rank the summary on a numeric scale (e.g., 1-10) using a field in the user interface 110 based upon its usefulness and/or the insight the summary provided into a document associated with the summary. In another embodiment, the user 104 may be able to select whether he/she "liked" or "disliked" the summary using the user interface 110. Using such user-provided information derived from a plurality of client devices (e.g., respectively associated with different users), the summary ranking component 114 may determine the popularity of a summary, or other metric that may be insightful to a user, using analytic, iterative, or other techniques known to those skilled in the art. For example, the summary ranking component 114 may determine that ninety-percent of those who rated the summary believed the summary was insightful and may store such ranking information related to the summary. As will be discussed below with respect to a summary ordering component 116, such information may be particularly relevant where there are multiple summaries associated with a single document.

It will be appreciated that in another embodiment, the summary ranking component 114 may programmatically, or automatically, determine the ranking of a summary without receiving user input. For example, in one embodiment, the summary ranking component 114 may determine a rank of a first summary associated with an article relative to other summaries associated with the same article based upon analytical, iterative, or other ranking techniques known to those skilled in the art. For example, the summary ranking component 114 may identify unique terms in the document and may rank the summaries related to the document based upon the number of matching unique terms. Thus, a summary with more unique terms that match those that are in the document is ranked higher than other summaries related to the document that have fewer, matching unique terms. In this way, summaries that are not ranked based upon user input (e.g., because user rankings have not been received on the summaries) and/or summaries that have been ranked by few users may be ranked, for example.

The ranking from the summary ranking component 114 may be useful to determine an order of the summaries that are displayed on the user interface 110 (or rather when a link to the summaries are displayed on the user interface 110) and/or to provide other users with information about the summaries. In this way, users may be guided to a summary that is more relevant or useful, for example. That is, a user may be guided to a summary that better describes the document to which the summary is related (e.g., relative to other summaries related to the document).

The example system 100 also comprises a summary ordering component 116 that is configured to order, or rank, the summaries based upon ranking metrics from the summary ranking component 114. Stated differently, the summary ordering component 116 is configured to determine how summaries, or links directing a user to respective summaries, are ordered when they appear on the user interface 110 to a user 104. For example, if a client device 108 issues a request for summaries related to a particular document and five summaries are retrieved from the summary data store 102 by the summary retrieval component 106, the summary ordering component 116 may determine which summary appears first (e.g., at a top of a list) and which summary appears fifth (e.g., at the bottom of the list) based upon information from the summary ranking component 114. It this way, summaries that have been determined to be more relevant or more on-point, for example, are distinguished from summaries which have been determined to be less relevant or less on-point. Thus, a user who has not already viewed the summaries may be guided to a summary that is more liked or more highly regarded by a majority of users that have already read the summaries related to the given document.

It will be appreciated to those skilled in the art that the example system 100 is merely one example embodiment. Other embodiments may comprise different components and/or the functionally described with respect to respective components may be combined, such that one component may perform the functions of two or more of the described components. For example, in another embodiment, the summary ranking component 114 and the summary ordering component 116 may be combined into a single component. In other embodiment, the functions of the respective components may differ from the described functionality. For example, in another embodiment, the summary data store 102 may store the summary ranking information instead of the summary ranking component 114, for example.

Figure 2:
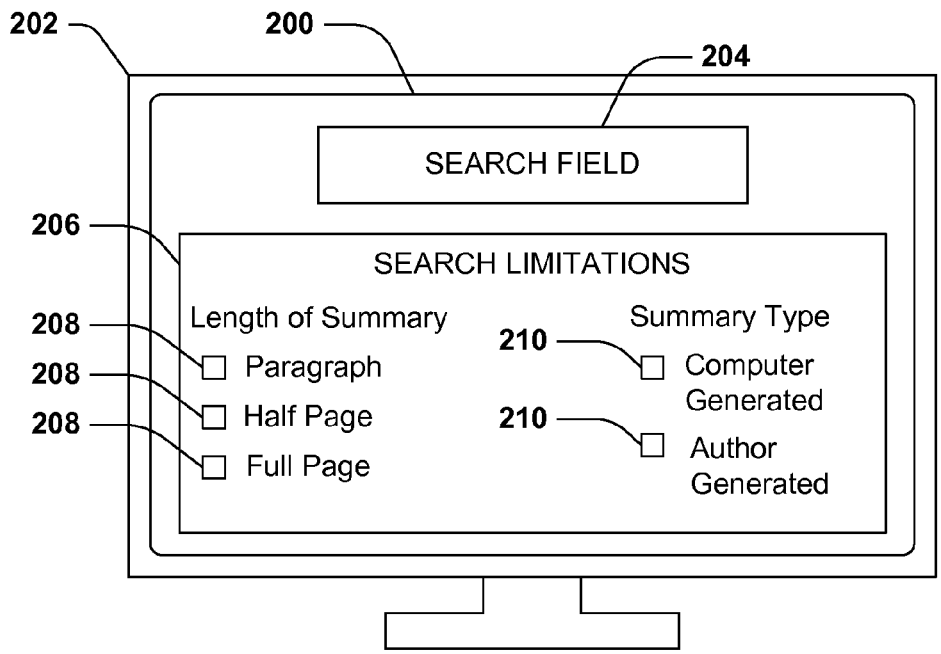
FIG. 2 is an example graphical user interface of a community content forum comprising a search field and search limitations field.

FIG. 2 illustrates an example user interface 200 (e.g., 110 in FIG. 1) that may be displayed on a monitor 202 of a client device (e.g., 108 in FIG. 1) after a user (e.g., 104 in FIG. 1) begins an application configured to search for summaries of one or more documents (e.g., opens a summary searching webpage in an internet browser). The user interface 200 comprises a search field 204 configured to receive user input (e.g., a text string) from a user. Based upon the information that is input into the search field 204, a request for summaries may be issued by the client device and summaries corresponding to the user input may be retrieved. For example, if a user inputs an author's name and/or the name of a document into the search field 204, a request for summaries related to the named document and/or summaries related to documents written by the named author may be issued by the client device. In this way, a user can use the user interface 200 to search for articles relevant to a topic that is of interest to the user, for example.

The example user interface 200 also comprises a search limitations field 206 that comprises one or more options that a user may select to limit the scope of a search, the number of summaries retrieved, etc. For example, in the example user interface 200, the search limitations field 206 comprises boxes 208 that a user may check to specify the length of retrieved summaries and/or boxes 210 that a user may check to specify whether the retrieved summaries are limited to programmatically generated summaries (e.g., computer generated summaries) and/or author generated summaries. It will be understood to those skilled in the art that the example search limitations are not an exhaustive list of limitations. That is, other limitations may be comprised in the search limitations field and/or one or both of the listed limitations may be excluded from the search limitations field. For example, in another embodiment, the user interface may comprise a field or box that allows the user to specify the number of summaries retrieved from a summary data store (e.g., 102 in FIG. 1).

Figure 3:
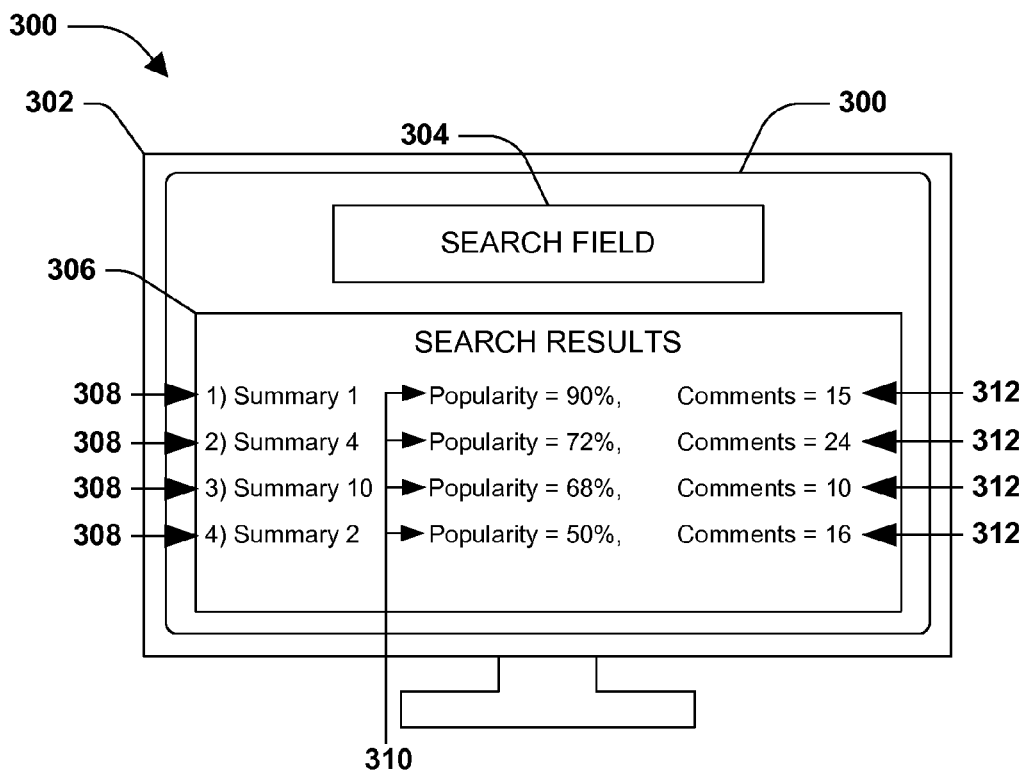
FIG. 3 is an example graphical user interface of a community content forum comprising a search field and search results field.

FIG. 3 illustrates an example user interface 300 that may be displayed on a monitor 302 (e.g., 108 in FIG. 1) after summaries, or links to summaries, have been retrieved from a summary data store (e.g., 102 in FIG. 1). That is, FIG. 3 illustrates an example user interface after a request has been made from a client device (e.g., 108 in FIG. 1) based upon the user input and summary results have been retrieved.

As illustrated, the example user interface 300 comprises a search field 304 (e.g., 204 in FIG. 2) configured to receive user input (e.g., if a new search is to be performed). For example, a user (e.g., 104 in FIG. 1) may refine a search using the search field 304 after a first search returns unsatisfactory results. Further, the example user interface 300 comprises a field for displaying search results 306 based upon a previously made request from a client device. The search results 306 may comprise the actual summaries themselves and/or links directing a user to the summaries.

As illustrated, the field for displaying search results 306 comprises four search results 308 (e.g., summary 1, summary 4, summary 10, summary 2) arranged according to their popularity 310, which may be derived from users that had previously read the summary. For example, as will be described below, in one embodiment, users that read the summary may have the option to specify whether they "like" or "dislike" the summary. Based upon this user feedback, a summary ranking component (e.g., 114 in FIG. 1), for example, may determine the popularity of the article, or rather the percentage of users who like the summary relative to the percentage of users who dislike the summary. Using the information generated by the summary ranking component, a summary ordering component (e.g., 116 in FIG. 1), for example, may arrange the retrieved summaries (prior to the summaries being displayed in the user interface 300). In this way, retrieved summaries may be arranged in a manner that may assist the user in determining which summaries are more relevant or provide a better synopsis of a document to which the plurality of summaries relate.

It will be appreciated that as illustrated, the search results also specify the number of comments 312 that have been made by other users about the respective summaries. Stated differently, in one embodiment, users that have viewed a summary may leave comments about the summary (e.g., suggestions to improve the summary, criticism, questions, etc.), and the number of comments 312 may also appear in the field for displaying search results 306. It will be understood to those skilled in the art that the comments may be stored with their respective summaries in the summary data store (e.g., 102 in FIG. 1) and/or in another storage medium, and the number of comments (or the comments themselves) may be retrieved when the summary (or a link to the summary) is retrieved by the summary retrieval component (e.g., 106 in FIG. 1) from the summary data store, for example.

Figure 4:
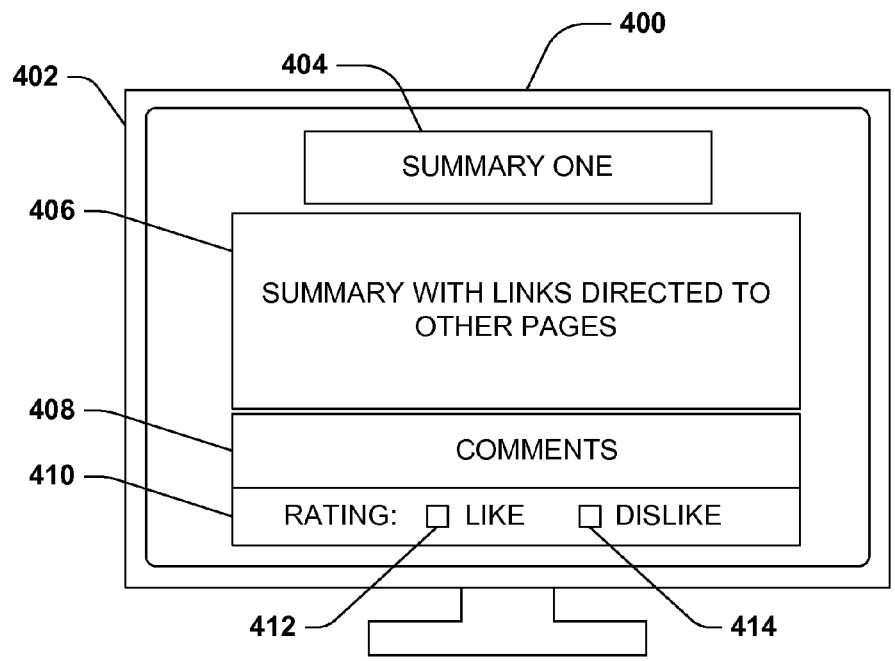
FIG. 4 is an example graphical user interface of a community content forum comprising a summary.

FIG. 4 illustrates an example user interface 400 that may be displayed on a monitor 402 of a client device (e.g., 108 in FIG. 1) when a first summary is retrieved. For example, returning to FIG. 3, a user may select the top link in the field for displaying search results 306 and the first summary may be retrieved from a summary data store (e.g., 102 in FIG. 1). As illustrated in FIG. 4, the example user interface 400 comprises a title field 404 for displaying the title of the summary (e.g., "Summary One") and a field containing the text of the summary 406.

The text of the summary generally relates to a document (e.g., a dissertation, technical journal article, book, etc.) and is written by another user of the forum (e.g., internet site, intranet site, etc.) and/or a computer program configured to generate the summary using analytic, iterative, or other summary generation techniques know to those skilled in the art. Moreover, in one embodiment, the text of the summary may comprise links that direct a user to other summaries, articles, webpages, etc. that pertain to the topic, for example. For example, Summary One may be an abbreviated summary of a document and the author, for example, who created the first summary may link the summary to other summaries related to the same document so that readers can gain more insight into the document (e.g., by selecting the link to another summary which provides greater insight into a particular aspect of the document). Moreover, the summary can link to other summaries (or documents) which describe related works, such as background works, that may be insightful to a user reading the summary, for example.

The example user interface 400 also comprises a comment section 408 wherein users that read the summary can leave comments. For example, a user may compose a comment in the comment section 408 that suggests modifications to the summary and/or that otherwise critic the summary. In another example, a user may leave a comment describing another document that may be pertinent to users who read this particular summary and may include a link to the pertinent document and/or a summary of the pertinent document, for example. Stated differently, the comment section 408 provides an open forum in which users can freely write and question (e.g., subject to limitations by a moderator of the forum in which the summary is hosted).

The example user interface 400 also comprises a ratings section 410 in which a user can rank the summary (e.g., relative to other summaries of the document) and/or provide insight into the importance/usefulness of the summary. For example, as illustrated, a user may select whether they "like" or "dislike" an article using the "like" box 412 and a "dislike" box 414. It will be appreciated that in one embodiment the selection of "like" box 412 or "dislike" box 414 from a plurality of users may be used to rank the summary relative to other summaries related to a document (e.g., using a summary ranking component 114 in FIG. 1). It will also be appreciated that while the example ratings section 410 comprises a "like" box 412 and a "dislike" box 414, in other embodiments, the user interface 400 may comprise other options for a user to rank or evaluate a summary. For example, in another embodiment, the ratings section 410 may comprise a numerical scale (e.g., 1-10) and a user can select the appropriate rating (e.g., where 1 indicates a bad summary and 10 indicates an insightful summary).

In one embodiment, the user interface 400 also comprises a summary modification field (not shown) comprising tools which a user can select to modify at least a portion of the summary. For example, a user reading Summary One may believe that additional information would be useful on a particular aspect of the summary and may select a link, for example, in the summary modification field which would unlock the summary so that the user could change the text of the summary. Further, the summary modification field may comprise a box for inserting a link into the summary. For example, using such a box, a user can insert a link into the summary which is directed to another summary and/or document, for example.

It will be appreciated that in one embodiment, the ability to modify a previously created summary may be limited (e.g., by a moderator of the forum). For example, in one embodiment, the user that created the summary may be granted privileges to modify the summary but other users may not be granted such privileges (e.g., other users can leave comments, but not change the actual text of the summary). In another embodiment, any user may be granted privileges to modify the summary. In yet another embodiment, a first group of users (e.g., editors) may be granted privileges to modify the summary, but other users, including the original author of the summary, for example, may not be entitled to modify the summary (e.g., unless the original author is part of the first group of users.

Figure 5:
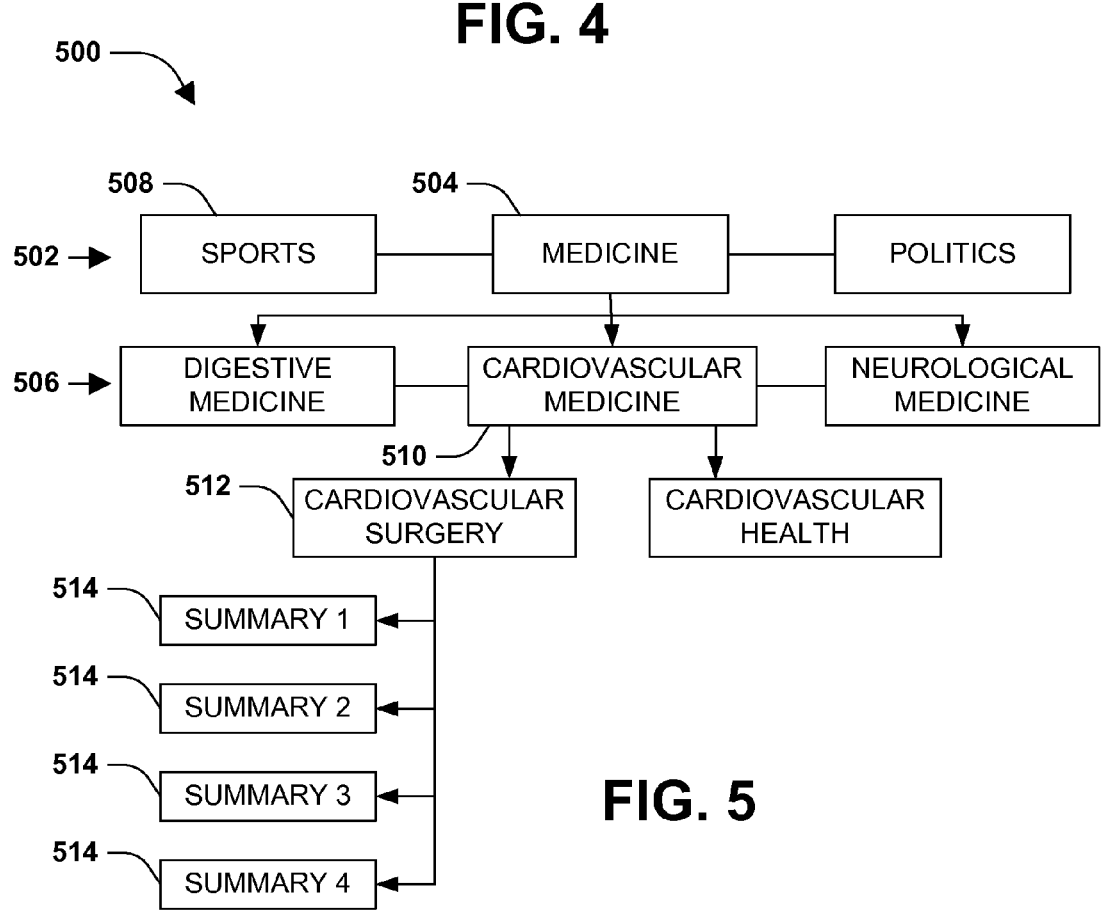
FIG. 5 is an example flow diagram of browsable categories that a user may navigate to identify a topic of interest.

FIG. 5 illustrates another embodiment for retrieving summaries from a summary data store (e.g., 102 in FIG. 1), for example. More particularly, FIG. 5 illustrates a flow diagram of a hierarchical system 500 wherein a user can locate one or more summaries by browsing categories (wherein the scope of the displayed categories are refined based upon previously selected categories). Stated differently, a user can begin a search by selecting one broad category. Based upon the selected category, secondary categories related to the selected category can be displayed. Generally, the secondary categories are more narrow in scope than the broad categories originally displayed to the user. In this way, users can experience hierarchical exploration by browsing categories until summaries related to documents pertaining to an area of interest are retrieved. Stated differently, a user can narrow the scope of summaries retrieved by repeatedly selecting categories (which tend to get narrower and narrower in scope) until summaries related to a particular aspect of the topic are retrieved.

For example, at illustrated in FIG. 5, links, respectively associated with at least one category of a first set of categories 502, may be displayed to a user (e.g., 104 in FIG. 1) in a user interface (e.g., 110 in FIG. 1) on a monitor of a client device (e.g., 108 in FIG. 1) when a user opens a program associated with the user interface or accesses a website that causes the user interface to be displayed. The first set of categories 502 generally are broad and cover a wide array of topics. The user may select a link associated with at least one category (e.g., medicine 504) of the first set of categories 502, and a second set of links associated with a second set of categories 506 may be displayed based upon the selected first category (e.g., medicine 504). Stated differently, based upon the selected category, a request may be generated by the client device. The request may provide information pertaining to which category was selected and request that a second set of links associated with a second set of categories 506 (e.g., falling within the umbrella of the selected category from the first set of categories 502) be retrieved from a summary data store, for example, and displayed to the user in the user interface. For example, as illustrated, the second set of categories 506 relate to medicine because the selected category in the first set of categories 502 was medicine 504. It will be appreciated that if a link indicative of another category, such as sports 508, was selected, the second set of categories 506 would relate to sports instead of medicine, for example.

The acts of selecting categories to narrow the scope of categories (also referred to as browsing categories) may be repeated until summaries related to documents on a topic of interest are retrieved. For example, in the illustrated embodiment, a user may select a link associated with the category of cardiovascular medicine 510 from the second set of categories 506 and links associated with a third set of categories 512 related to cardiovascular medicine 510 may be displayed in the user interface. The user may then select a link associated with the third set of categories (e.g., cardiovascular surgery 512) and a plurality of summaries 514, or links to a plurality of summaries, associated with documents on cardiovascular surgery may be displayed to the user in the user interface.

It will be appreciated that in another embodiment, a hierarchical arrangement as described with respect to FIG. 5 may be used in conjunction with a search field as described with respect to FIGS. 2-4. For example, a user may begin a search by selecting a link to a category of interest. Once the link is selected, the user may enter a search term and a search may be performed within the category of interest. For example, the user may select a link associated with medicine 504 from the first set of categories and a subsequent search (e.g., based upon one or more search terms) may be limited to summaries of documents within the category of medicine (e.g., summaries of documents related to sports may be excluded from the search). In this way, the scope of a search may be limited to categories and summaries indicative of documents associated (only) with the category of interest, for example.

Figure 6:
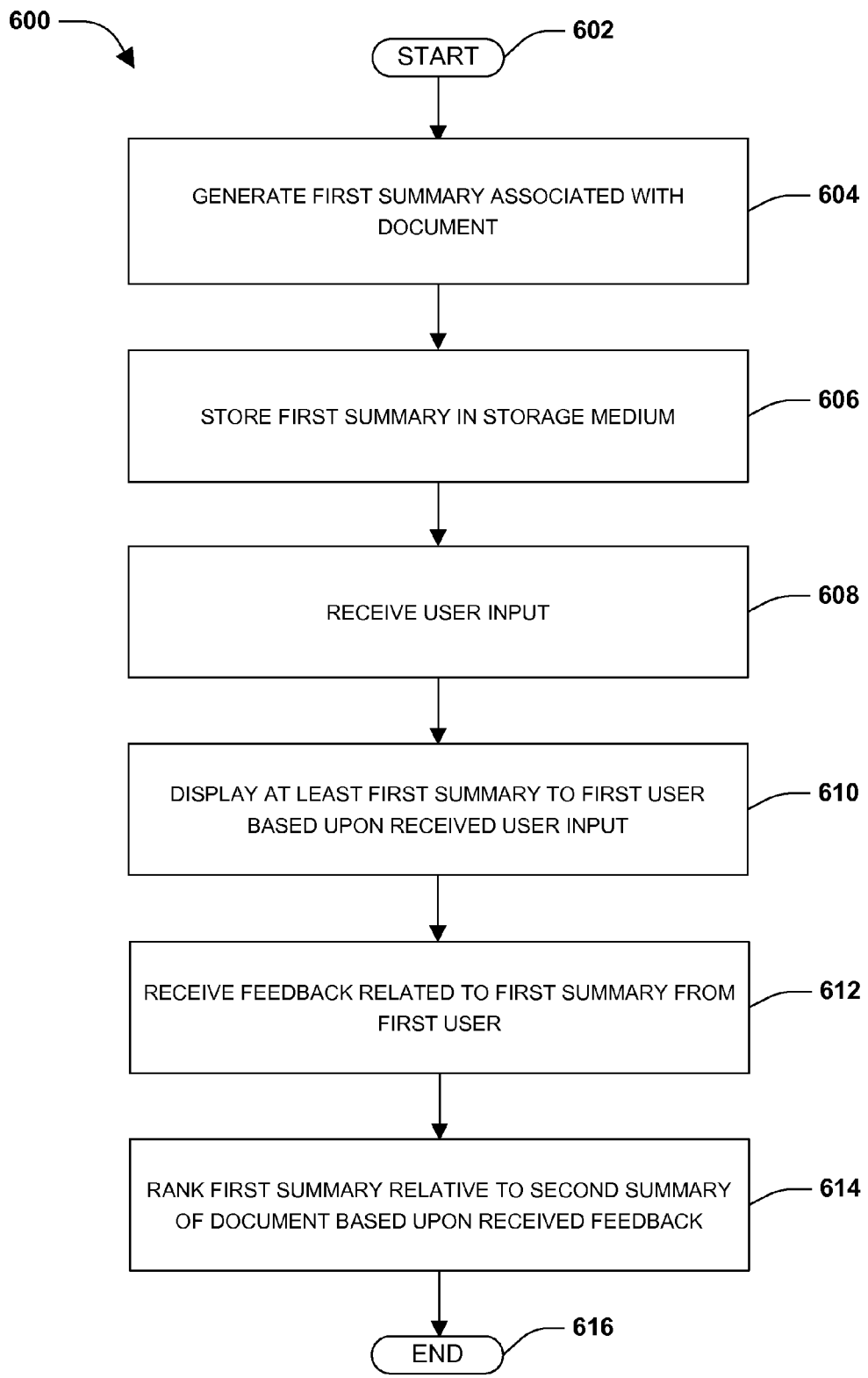
FIG. 6 is a flow chart illustrating an exemplary method of sharing one or more summaries indicative of a document.

FIG. 6 illustrates an example method 600 for sharing one or more summaries indicative of a document. The method begins at 602 and a first summary, associated with a document, is generated at 604. In one embodiment, the summary is generated automatically using analytical, iterative, or other content generation techniques known to those skilled in the art. For example, the summary may be generated based upon the identification of unique terms and/or phrases in the document. In another embodiment, the summary may be using terms and/or phrases that are in specified locations of the document, such as phrases contained in an "abstract" portion of the document, for example.

It will be appreciated that automatic summary generation is not time specific. That is, the summary may be generated at any time. For example, in one embodiment, the first summary is automatically generated when the underlying document is created and/or discovered (e.g., by a web crawler). In another embodiment, the first summary is automatically created when a user searches for summaries related to the document in the summary data store. That is, the summary may be automatically created because no summaries of the document previously existed in the data store, for example, and a user has recently searched for summaries of the document in the data store and/or selected a linking pointing to summaries of the document. Stated differently, automatic summary generation may be used when no summaries of a document exist in a summary data store but a user has selected to view a (previously non-existent) summary of the document, for example.

In another embodiment, the first summary is generated by an author (e.g., a user of the forum). That is, the author of the summary reads a document and writes a summary of the document briefly describing the contents of the document. In one embodiment, such as where the forum in which the summaries are displayed is a webpage, the author may be one of many users to the webpage, and at least a plurality of the users may be responsible for writing summaries which are displayed on the webpage. In this way, a webpage comprising socially authored content, also referred to as community authored content, may be created. The webpage may comprise a plurality of summaries of the same and/or different documents authored by a plurality of different users, for example.

In one embodiment, the author may insert links into the first summary which direct readers of the summary to other summaries, documents, webpages, etc. that provide additional information on a topic discussed in the summary and/or provide relevant insight into the document and/or summary. In another embodiment, such links may be inserted automatically using analytic, iterative, or other link insertion techniques known to those skilled in the art. For example, in one embodiment, where the summary comprises a term that is not generally known and/or commonly used, a link may be inserted automatically and/or by the author directing the user to a webpage containing a definition of the term. In another example, links may be inserted automatically and/or by the author that direct users to other summaries which discuss background information for the summary (or the document to which the summary relates).

At 606, the first summary (generated automatically or by an author) is stored in a storage medium, or a summary data store (e.g., 102 in FIG. 1), for later retrieval by the author, or another user to the forum. Such a storage medium may also comprise other summaries of the same and/or other documents that are automatically generated, created by the author, and/or created by other users of the forum. In this way, the storage medium may comprise a plurality of socially authored summaries, for example.

At 608, user input (e.g., from the author or another user to the forum) is received. For example, as described with respect to FIGS. 2-4, a search string (or request generated based upon the received search string) indicative of at least one of the first summary, the document to which the first summary relates, and/or a category (e.g., medicine, sports, etc.) to which the first summary relates, maybe received. In another embodiment, as described with respect to FIG. 5, the user input that is received may be a category selection that the user has browsed to and selected (e.g., cardiovascular surgery). That is, the user may select a category and then select one or more subcategories within the category until a desired subcategory is identified and selected by a user (at which time a request for summaries related to the subcategory may be retrieved).

At 610, at least the first summary is displayed to a first user based upon the received user input. That is, the summary data store may be searched for one or more summaries that satisfy the user input and such summaries, or links to such summaries, may be displayed to the user.

It will be appreciated that the summaries, or links to the summaries, that are displayed to the user are a function of the user input that is received. For example, in one embodiment, the user input that is received may comprise length selection data (e.g., as described with respect to FIG. 2) and summaries that would otherwise satisfy the user input (e.g., are related to a document the user searched for) may not be displayed. For example, in one embodiment, there are two summaries of a document stored in the summary data store, one of the two summaries being a page long and the other summary being half a page long. If the user merely searches for summaries related to the document, both of the summaries may be displayed. However, if the user further limits the search by specifying that the retrieved summaries be a page long (e.g., the user input comprises length selection data), the page long summary of the document may be displayed and the half page summary may not be displayed. Conversely, if the user limits the search to half page summaries, the half page summary may be displayed but the page long summary may not.

At 612, feedback related to the first summary is received from the first user. That is, the user reads the summary and provides feedback about the summary. For example, in one embodiment, the user may provide a comment (e.g., suggestion, question, etc.) about the first summary. Such a comment may provide the author of the summary with information with which he/she can modify the summary. Further, the comment may provide other users (e.g., future readers of the summary) with additional information that may be relevant to others. For example, the first user may provide background information which helps other users better understand the summary and/or may provide a link to other sources which provide such background information.

In another embodiment, the feedback may comprise a ranking or other metric that may be used to provide other users with information on the usefulness or relevance of the summary to the document, for example. In one embodiment, the first user may rank on a scale of 1-10 how accurately he/she believes the summary describes the document. In another embodiment, the first user may select whether he/she "likes" or "dislikes" the summary. Such feedback from the first user may be aggregated with the feedback from other users that have read and ranked the summary to determine the popularity of the summary, for example. In this way, future users that are looking for a summary of the document may be provided some insight into how others felt about the article (e.g., so that the user can select a summary of the document that a majority of users have believed is well-written).

At 614 the first summary is ranked relative to a second summary of the document based upon the received feedback. Stated differently, where there are at least two summaries of a document, the summaries may be ranked, or ordered, based upon the received feedback. In one example, such summaries are ranked such that the summary that has received, in the aggregate, a higher rating by users (e.g., a higher numerical rating on a scale of 1-10, more "likes," etc.) is ranked above a second summary of the document which has received lower rating.

In one embodiment, as described in FIG. 3, the first and second summaries can be displayed to a second user (e.g., a future user) based upon their relative rankings. For example, if the first summary is ranked higher than the second summary (e.g., based upon the aggregated feedback from a plurality of users) that first summary may be displayed above the second summary in a list of summaries if both the first and second summaries are retrieved from the summary data store or if links to both summaries are displayed to the second user. Moreover, if the second summary is ranked higher than the first summary, the second summary may appear above the first summary in a list of summaries displayed to the user.

It will be appreciated to those skilled in the art that as more users read the summaries, the ranking, or popularity, of the respective summaries may change. Thus, the ranking of the first summary relative to the second summary may change and the order of summaries which are displayed to future users may change. For example, as a result of changes in the popularity of respective summaries, the first summary (originally ranked higher than the second summary) may decrease in popularity such that it is ranked lower than the second summary. Thus, when displayed to future users, the second summary (which was originally ordered below the first summary) may be ordered above the first summary in a list of summaries, for example.

The example method 600 ends at 616.

Figure 7:
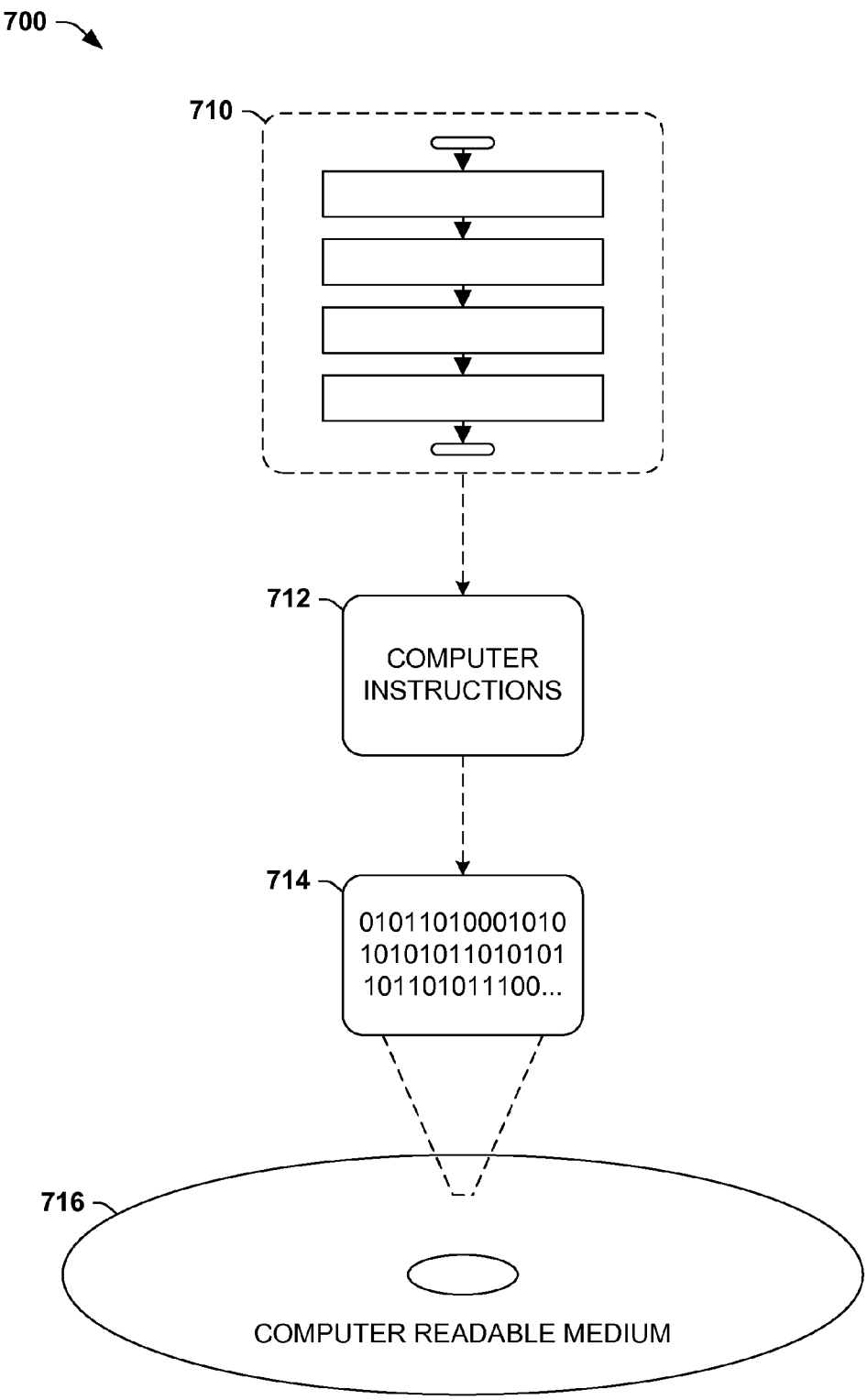
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as the exemplary method 600 of FIG. 6, for example. In another such embodiment, the processor-executable instructions 712 may be configured to implement a system, such as the exemplary system 100 of FIG. 1, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
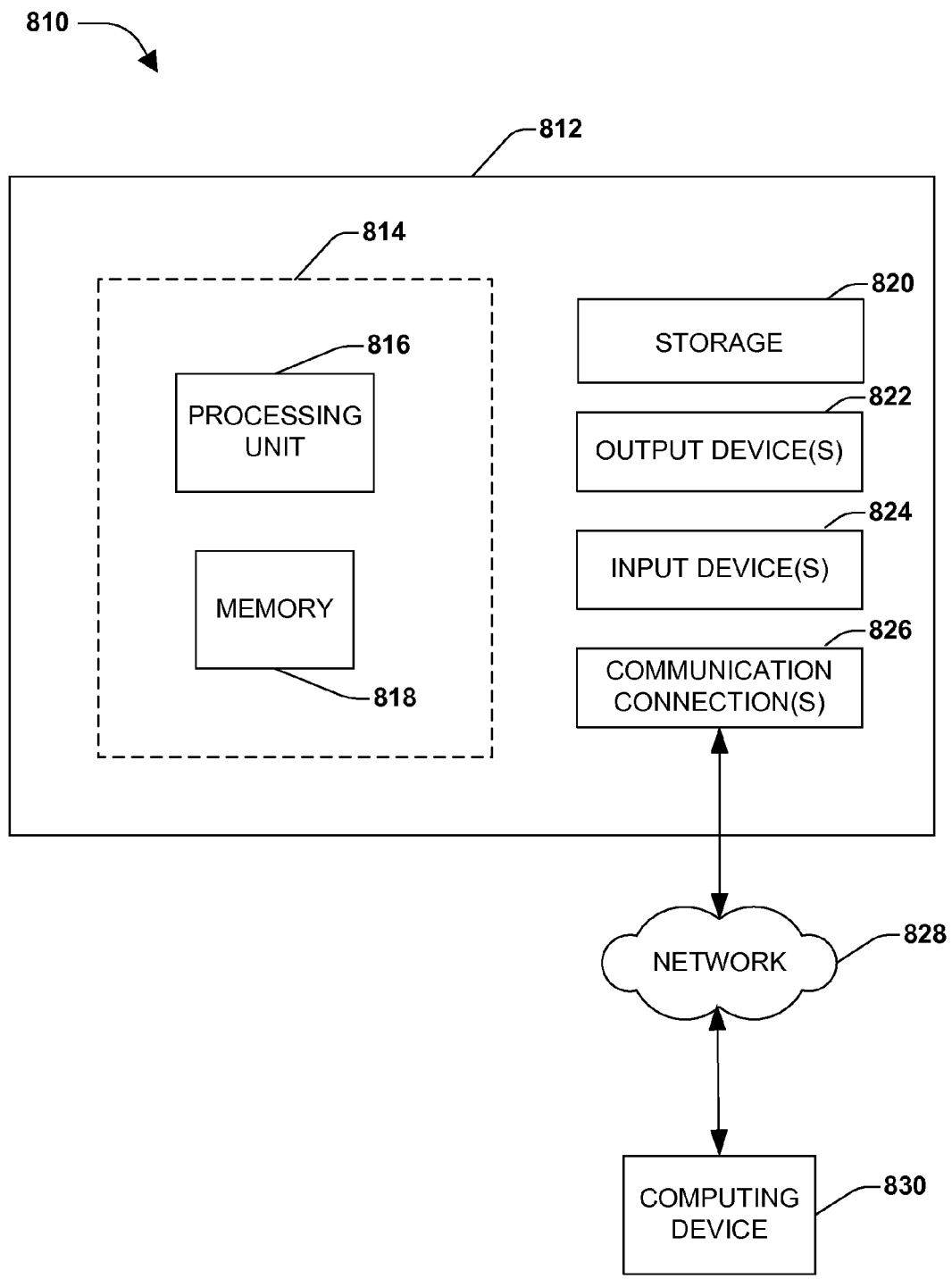
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
providing, for presentation to a first distinctly identifiable entity, a first summary of a document, the first summary of the document authored by a second distinctly identifiable entity;
receiving feedback from the first distinctly identifiable entity resulting in a modification to the first summary of the document to generate a first modified summary of the document;
ranking, via a processing unit, the first modified summary of the document relative to a second summary of the document based upon one or more programmatic rankings for one or more of the first modified summary of the document or the second summary of the document, the one or more programmatic rankings based upon a comparison of a first number of unique terms in the first modified summary of the document that match first unique terms in the document with a second number of unique terms in the second summary of the document that match second unique terms in the document; and
providing, for presentation to a third distinctly identifiable entity, the first modified summary of the document and the second summary of the document in a first ranked order based upon the ranking.

2. The method of claim 1, the ranking based upon one or more rankings received from one or more users.

3. The method of claim 1, the first modified summary of the document different than the first summary of the document.

4. The method of claim 1, the first unique terms the same as the second unique terms.

5. The method of claim 1, the first unique terms not the same as the second unique terms.

6. The method of claim 1, comprising automatically generating one or more of the first summary of the document or the second summary of the document in response to a search.

7. The method of claim 1, the receiving feedback from the first distinctly identifiable entity comprising:
receiving a link to be inserted into the first summary of the document.

8. A computer readable medium, where the computer readable medium is a device, comprising instructions that when executed, perform a method, comprising:
providing, for presentation to a first distinctly identifiable entity, a first summary of an object, the first object authored by a second distinctly identifiable entity;
receiving feedback from the first distinctly identifiable entity resulting in a modification to the first summary of the object to generate a first modified summary of the object;
ranking the first modified summary of the object relative to a second summary of the object based upon one or more programmatic rankings for one or more of the first modified summary of the object or the second summary of the object, the one or more programmatic rankings based upon a comparison of a first number of unique terms in the first modified summary of the object that match first unique terms in the object with a second number of unique terms in the second summary of the object that match second unique terms in the object; and
providing, for presentation to a third distinctly identifiable entity, the first modified summary of the object and the second summary of the object in a first ranked order based upon the ranking.

9. The computer readable medium of claim 8, the method comprising automatically generating the first summary of the object in response to a search.

10. The computer readable medium of claim 8, the method comprising automatically generating the second summary of the object in response to a search.

11. The computer readable medium of claim 8, the first summary of the object generated after generation of the second summary of the object.

12. The computer readable medium of claim 8, the feedback comprising a link.

13. The computer readable medium of claim 8, the feedback comprising a comment.

14. The computer readable medium of claim 8, the feedback comprising a vote.

15. A computer readable medium, where the computer readable medium is a device, comprising instructions that when executed, perform a method, comprising:
   automatically generating a first summary of a document in response to a search;
   displaying the first summary of the document and a second summary of the document in a ranked order;
   reordering the first summary of the document and the second summary of the document based upon one or more programmatic rankings for one or more of the first summary of the document or the second summary of the document, the one or more programmatic rankings based upon a comparison of a first number of unique terms in the first summary of the document that match first unique terms in the document with a second number of unique terms in the second summary of the document that match second unique terms in the document; and
   displaying the first summary of the document and the second summary of the document in a second ranked order, the second ranked order a function of the reordering.

16. The computer readable medium of claim 15, the reordering based upon one or more rankings received from one or more users.

17. The computer readable medium of claim 15, the first summary of the document different than the second summary of the document.

18. The computer readable medium of claim 15, the ranked order different than the second ranked order.

19. The computer readable medium of claim 15, the first number of unique terms different than the second number of unique terms.

20. The computer readable medium of claim 15, the method comprising automatically generating the second summary of the document in response to a second search.

* * * * *